No. 854,752. PATENTED MAY 28, 1907.
H. N. MARVIN & H. CASLER.
APPARATUS FOR DELINEATING CHARACTER ACCORDING TO THE CHARACTER
OF THE HAND.
APPLICATION FILED SEPT. 25, 1905.

Witnesses
Raphaël Netter
S S Dunham

Inventors
Harry N. Marvin and Herman Casler
By their Attorneys
Kerr, Page & Cooper No. 854,752. PATENTED MAY 28, 1907.
H. N. MARVIN & H. CASLER.
APPARATUS FOR DELINEATING CHARACTER ACCORDING TO THE CHARACTER OF THE HAND.
APPLICATION FILED SEPT. 25, 1905.

Witnesses
Raphaël Netter
A S Dunham

Inventors:
Harry N. Marvin and Herman Casler
By their Attorneys
Kerr, Page & Cooper No. 854,752. PATENTED MAY 28, 1907.
H. N. MARVIN & H. CASLER.
APPARATUS FOR DELINEATING CHARACTER ACCORDING TO THE CHARACTER OF THE HAND.
APPLICATION FILED SEPT. 25, 1905.

No. 854,752. PATENTED MAY 28, 1907.
H. N. MARVIN & H. CASLER.
APPARATUS FOR DELINEATING CHARACTER ACCORDING TO THE CHARACTER OF THE HAND.
APPLICATION FILED SEPT. 25, 1905.

Witnesses
Raphael Petter
J S Dunham

Inventors
Harry N. Marvin and Herman Casler
By their Attorneys
Kerr, Page & Cooper No. 854,752. PATENTED MAY 28, 1907.
H. N. MARVIN & H. CASLER.
APPARATUS FOR DELINEATING CHARACTER ACCORDING TO THE CHARACTER OF THE HAND.
APPLICATION FILED SEPT. 25, 1905.

No. 854,752. PATENTED MAY 28, 1907.
H. N. MARVIN & H. CASLER.
APPARATUS FOR DELINEATING CHARACTER ACCORDING TO THE CHARACTER
OF THE HAND.
APPLICATION FILED SEPT. 26, 1905.

Witnesses
Raphaël Netter
S S Dunham

Inventors
Harry N. Marvin and Herman Casler
By their Attorneys
Kerr, Page & Cooper

UNITED STATES PATENT OFFICE.

HARRY N. MARVIN AND HERMAN CASLER, OF CANASTOTA, NEW YORK.

APPARATUS FOR DELINEATING CHARACTER ACCORDING TO THE CHARACTER OF THE HAND.

No. 854,752.  Specification of Letters Patent.  Patented May 28, 1907.

Application filed September 25, 1905. Serial No. 279,979.

*To all whom it may concern:*

Be it known that we, HARRY N. MARVIN and HERMAN CASLER, citizens of the United States, residing at Canastota, in the county of Madison and State of New York, have invented certain new and useful Improvements in Apparatus for Delineating Character According to the Character of the Hand, of which the following is a specification, reference being had to the drawings accompanying and forming a part of the same.

It is generally believed or assumed that the human hand is in some degree an index of the character or disposition of an individual, the length or shape of the hand varying with the character or disposition.

Our present invention is an apparatus for indicating personal characteristics in accordance with the shape of the human hand and is designed for purposes of amusement by giving automatic responses, framed from the results of study of the subject, to accord with the shape or size of any hand applied to it.

In general, the apparatus comprises an element, in the nature of a gage, to which the hand is applied in a prescribed manner, and which controls the operation of the machine according to the size and shape of the hand; another element, which ordinarily consists of a magazine of cards bearing different inscriptions; and intermediate mechanism adapted to deliver or display one or another of such cards according to the particular adjustment produced by the gage as affected by the character of the hand applied thereto.

Our invention is more particularly in the nature of an improvement on that described and claimed broadly in the copending application of Harry N. Marvin, filed April 18th, 1905, Serial No. 256,329, now Patent No. 803,002, issued October 31, 1905.

In carrying out our present invention in its preferred form, we employ a series of card chutes or racks, and mechanism for delivering a card from any one of the chutes, according to the adjustment of the ejecting devices, which depends upon the dimensions of the hand applied to the hand gage. The latter includes a number of pins or plungers on which the hands rests and which are adapted to be lifted from their normal positions by devices which travel over their lower ends. Combined with these travelers are devices connected with the card selecting mechanism and so constructed and arranged that as long as the pins meet the hand, and therefore prevent the upwardly pressing traveler from rising out of its path, the card selecting devices will continue to be actuated. But as soon as the traveler or travelers move beyond the hand, so that the pins against which they press can rise to their full extent, the elevation of the traveler causes the mechanism to be locked, which determines the position which the selecting devices will take relative to the different chutes. All of the cards in a given chute bear inscriptions of the same general character, so that individuals having hands of substantially the same size will receive cards of the same general kind, while a person with a longer or shorter, or broader or narrower hand, will receive a totally different card. In practice we prefer to make the different kinds or classes of cards with readily distinguishable visual characteristics, as for example by making them of different shapes, or in different colors, as many as there are "types" of hands, each "type" of course having its own chute. This makes it easy for an onlooker to note, (with consequent arousing of his curiosity), that one operator always receives a card of the same color, as red, or the same shape, as square, while another operator always receives green, or triangular cards, still another receiving always yellow, or hexagonal cards, etc.

It is obvious that the specific construction of the mechanism thus generally outlined may be very greatly varied without departure from the invention, but in order to enable those skilled in the art to construct and operate the same readily, we refer now to the drawings which illustrate the improvement in its preferred embodiment.

The apparatus is inclosed in a suitable casing 1, having a front extension 2, on the top of which is exposed the plate on which the person using the machine rests his hand. In the upper part of the casing is the card magazine, and in the lower part the mechanism which measures the hand and actuates the card-ejecting devices, all the functions of the machine being effected by the operating handle, 3, which the user pulls forward, toward him, until it strikes a stop 4 on the side of the casing.

Figures 3, 4, 5, 6, 7:
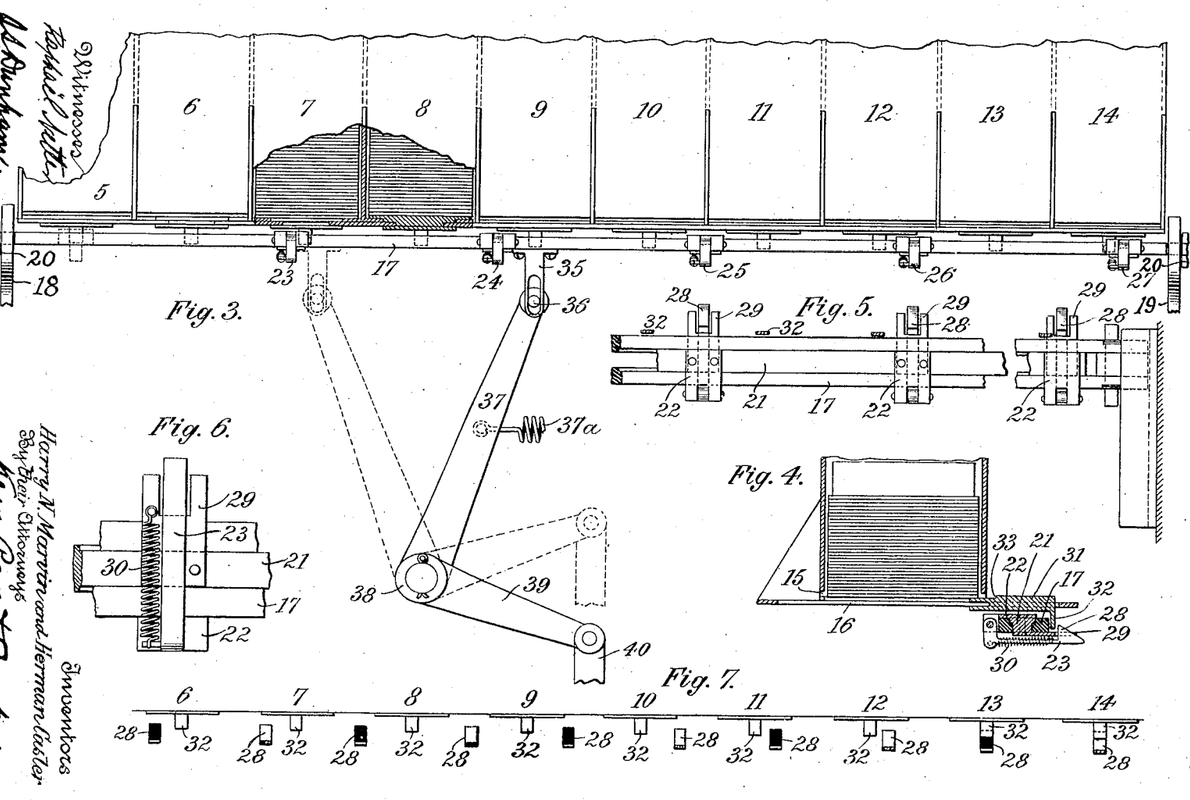
Fig. 3 is a front view of the card magazine, showing the several chutes or racks composing the same, and the mechanism for ejecting cards therefrom.
Fig. 4 is a detail sectional view, showing one of the card ejectors and the devices which actuate it.
Fig. 5 is a top plan view of several of the ejector actuating devices, showing their positions relative to the ejectors.
Fig. 6 is a detail under plan view of one of the ejector mechanisms.
Fig. 7 is a diagram showing the arrangement of the ejectors and their actuating devices.

The card magazine, (see Figs. 1 to 7, inclusive), is composed of any suitable number of chutes or racks, as for example ten, designated by the numerals 5 to 14 inclusive. Each chute has a slot 15 in its front wall near the bottom, through which the lowermost card of the stack therein may be ejected, and the bottom of each chute has a slot extending from front to rear, the edges of which constitute guides or rails on which the ejectors move. One of such guides is shown at 16, Fig. 4.

Extending across the magazine, below and behind the same, is a bar 17, engaged at its ends by the forked ends of levers 18, 19, by which it may be moved forward and backward under the card chutes, the ends of the bar moving in suitable guides, as 20, on the sides of the casing. Mounted in the ejector-actuating bar 17 and adapted to be reciprocated therein is a slide 21, having on its top a series of plates 22, to which are pivoted a series of pawls, indicated by the numerals 23 to 27 inclusive, each pawl extending rearwardly under the bar and terminating in an upwardly extending tooth, as 28. On the under side of the slide 21 are plates 29, arranged adjacent to the pawls, and provided at their ends with notches, through which the pawl teeth extend, as shown for example in Figs. 5 and 6. The pawls are held in the position of Fig. 4 by springs connected with the plates 29, the springs shown in Figs. 4 and 6 being designated by 30.

The bottom plate of each card chute extends to the rear of the chute, and on the rails formed by the edges of the slot, before mentioned, is an ejector, as 31, having a downwardly extending finger 32, which may be engaged by the tooth on one of the pawls as the same is carried forward by the bar 17. The ejector in its forward movement engages the bottom card by means of a shoulder, as 33, on its upper surface, and pushes the card out into the receiver 34, Fig. 2, where it may be taken by the operator.

It will be observed that while there are ten card chutes and an ejector for each of them, there are but five pawls to actuate the same. Nevertheless it is possible to actuate any one ejector at will, and no others, by these five pawls. This result is secured by arranging the pawls on the principle of the vernier scale, as will be more clearly seen by reference to Fig. 7, which is a diagrammatic front view of the ejecting devices, one of the chutes, 5, being omitted. The pawls are spaced apart a distance equal to one and four-fifths the distance between ejectors. Hence when the slide is shifted to the left, so as to bring the right hand pawl into engagement with the ejector of chute 14 no other ejectors will be engaged, and a card from chute 14 only will be thrown out. Moving the slide farther will bring the second pawl into engagement with the ejector of chute 12. In the next three positions of the slide the ejectors of chutes 10, 8 and 6 will be engaged by the third, fourth and fifth pawls respectively. Moving the slide to the sixth position will bring the first pawl into engagement with the ejector of chute 13, this position of the pawls being indicated by the solid black in Fig. 7. The remaining four positions bring the second, third, fourth and fifth pawls into engagement with the ejectors of chutes 11, 9, 7 and 5 respectively. It will therefore be seen that by a total movement of the slide less than the distance between alternate chutes each ejector may be actuated.

For the purpose of shifting the slide 21 it is provided with a slotted finger 35 which is engaged by a stud 36 on the end of an arm 37 on a sleeve 38, which latter is actuated by an arm 39 and link 40 connected therewith. The stud or pin 36 is of sufficient length, as will be seen in Fig. 2, to permit the bar to oscillate without disengaging the stud from the finger 35. The link 40 is pivoted at its lower end to a block 41, Fig. 2, on a carrier 42 arranged to reciprocate vertically on guide rods 43, the block and carrier being held in their lowermost position by a spring 37$^a$ connected with lever 37,—see Figs. 1 and 3. When the main operating shaft 44 is rocked by the handle 3 an arm 45 on the said shaft strikes the face 46 on the block and raises the same, thus actuating the arm 37 and slide 21, as will be readily understood. Inasmuch as certain other functions are to be performed by other mechanisms before the slide 21 is set, the arm 45 is arranged at an angle to the plane occupied by the face 46, so that the shaft can turn some distance before the block 41 is raised; and since another function, as the forward movement of the bar 17 to eject a card, is to be performed after the block is raised, the arm 45 is mounted loosely on the shaft 44, but is held yieldingly in its normal position, as in Fig. 2, by a coil-spring 47 attached to a stop 48 rigidly mounted on the shaft, so that after the block is checked the yielding of the spring will permit the shaft to turn still farther.

Figures 11, 12:
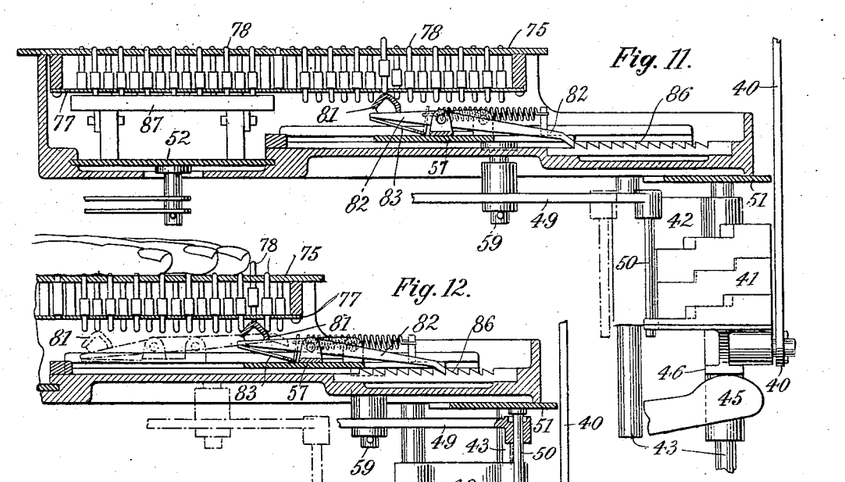
Fig. 11 is a section similar to Fig. 9, showing the operative parts of the hand-measuring mechanism in another position.
Fig. 12 is a section similar to that of Fig. 9, showing the positions occupied by the parts when measuring the length of the hand.
Figure 13:
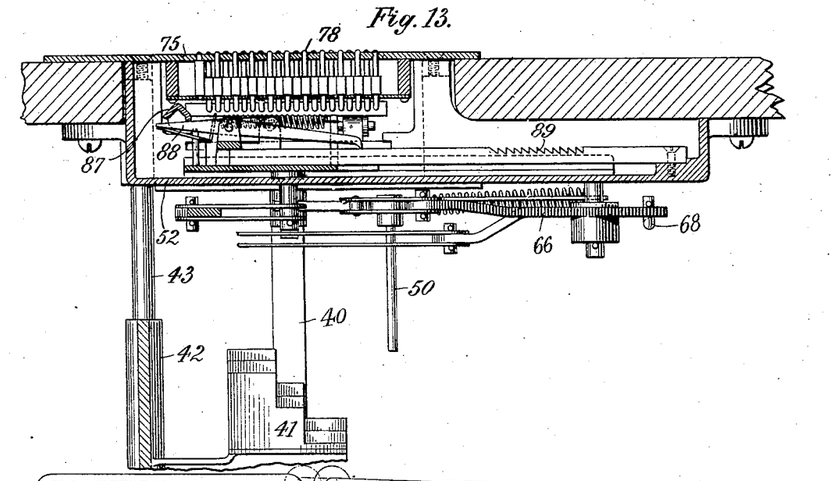
Fig. 13 is a section on line XIII—XIII, Fig. 8, showing the initial position of the devices which measuse the width of the hand.
Figure 15:
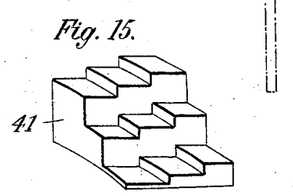
Fig. 15 is a detail perspective view of the gage-block, which actuates the card selecting devices according to the dimensions of the hand as found by the measuring mechanism.

It is evident that the extent of the upward movement of the block 41 determines the position of the slide 21 and therefore the chute from which a card is ejected. Consequently means are provided as follows to control the upward movement of the block. By referring to Fig. 15 it will be seen that the block has a series of steps, nine in number, and all of different heights. In Figs. 11 and 12 will be seen a horizontally swinging lever 49, carrying at its right end a gage rod 50, capable of vertical movement therein. The lever may also be moved bodily to the right, by means hereinafter described. Assuming now that the block is in its initial or lowermost position, as in Fig. 2, if the lever be so moved as to bring the gage rod over the block the extent to which the latter rises will depend on what step the rod is brought to rest over, the upward movement of the rod being limited by the fixed plate 51. For example, the height of the block in Fig. 12 is greater than if the gage rod had rested over one of the higher steps. If the rod were not carried far enough to reach the block, or so far as to pass beyond the block, the latter could rise to its highest position, as in Fig. 11, thus giving ten positions though there are only nine steps on the block. These ten positions produce the ten positions of the ejector slide 21, as previously explained, and hence determine the chute from which a card is ejected.

Figure 8:
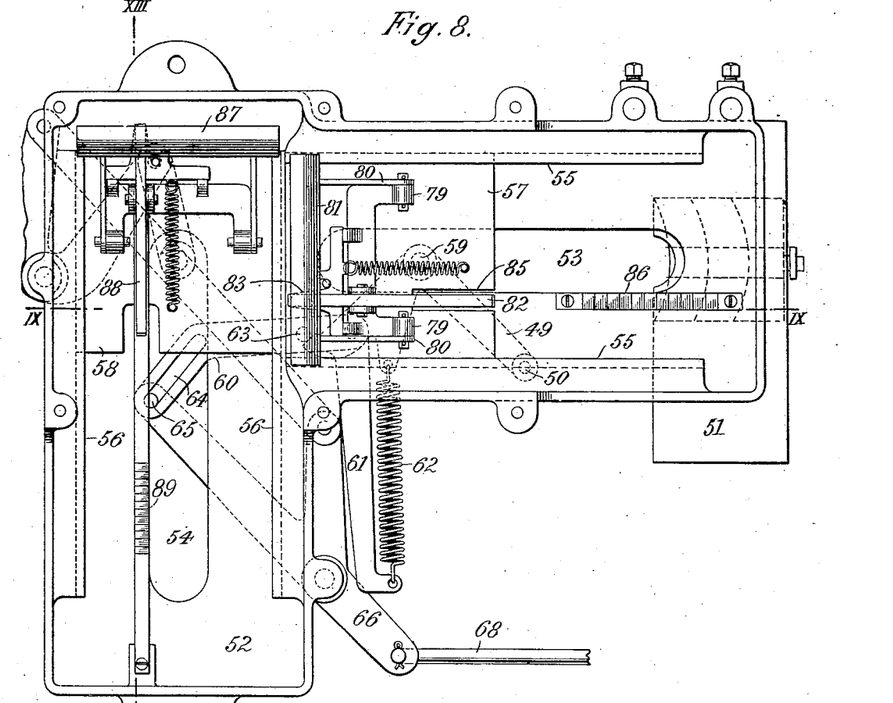
Fig. 8 is a top plan view of the hand-measuring mechanism, the casing containing the gaging pins being removed.
Figure 9:
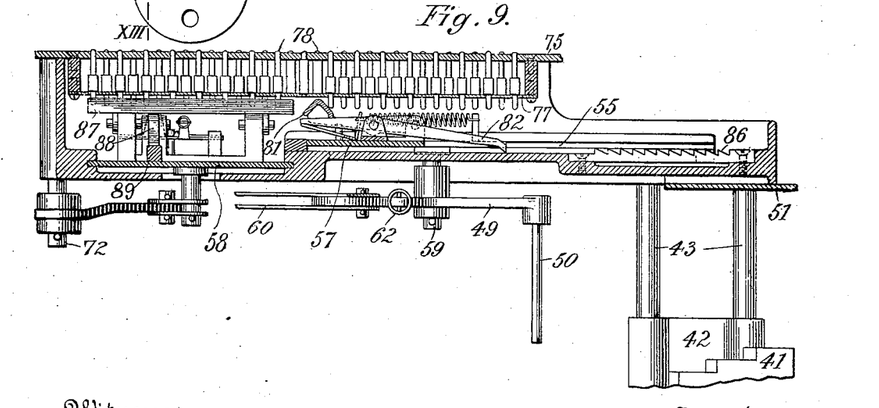
Fig. 9 is a section on line IX—IX, Fig. 8, with the gage-pin casing replaced, showing the operative parts in their initial positions.
Figure 14:
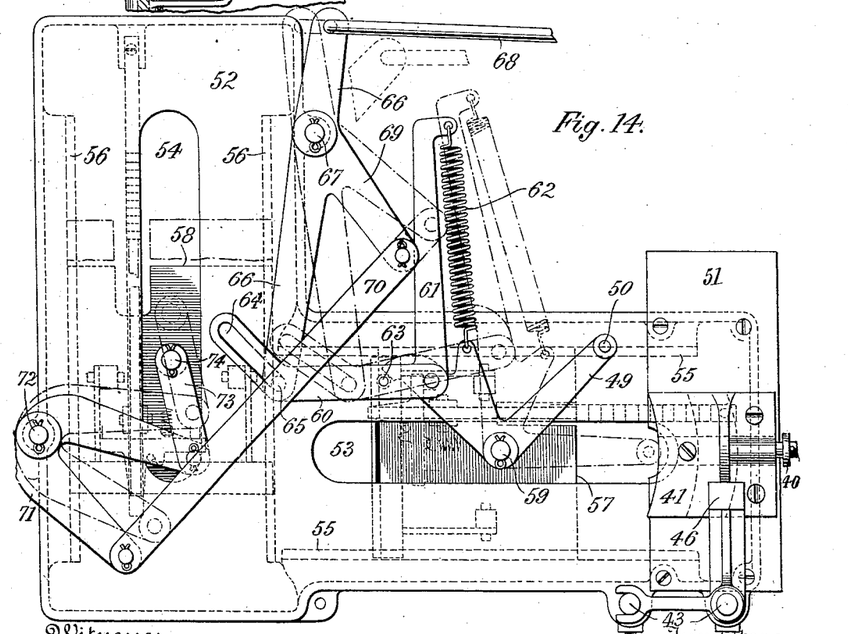
Fig. 14 is an under plan view of the hand-measuring mechanism.

The gage rod is brought into operative relation to the gage block by the following mechanism. Arranged a short distance below the top of the front extension 2 of the casing 1 is a supporting plate 52. An under plan view of this plate and the parts now to be described is shown in Fig. 14. This plate has two slots, designated by 53 and 54, the former extending longitudinally and the latter transversely of the machine. At the sides of the slots, on the top of the plate, are rails or guides 55, 56, respectively, on which are mounted carriages 57, 58. On the bottom of carriage 57 is a stud 59, extending through the slot 53, and it is on this stud that the bell crank lever 49 is fulcrumed, which lever, it will be remembered, carries the gage rod 50. To the other arm of the lever 49 is pivoted a link 60, and from the pivoted end of the link extends a rigid arm 61 to which the bell crank lever is connected by a spring 62. On the link is also a stop 63, against which the adjacent arm of the bell crank lever may bear, so that the latter is normally yieldingly held in the full-line position shown in Fig. 14. At the other end of the link 60 is a slot 64, arranged at an angle to the link, engaged by a stud 65 on the end of a lever 66, which is fulcrumed at 67 to the supporting plate 52 and actuated by a link 68 suitably connected with the main operating shaft, as will be more fully explained hereinafter. The operation of the parts will now be easily understood. The initial position is shown in Fig. 8, from which it will be seen that as the link 68 is moved to the left the stud 65 will pass along the slot 64, and when it strikes the lower end of the slot it will move the lever 49 and carriage 57 bodily to the right, the carriage being shifted on the rails 55. As long as the carriage is free to move, the lever 49 will occupy its initial position relative thereto, that is to say, it will not be turned on its fulcrum to carry the gage rod 50 laterally toward the gage block 41. But if the carriage be positively held, continued movement of the lever 66 will swing the bell crank lever away from the stop 63, and bring the gage rod toward the gage block, as will be readily understood. It may here be said that the movement of the lever 49, (and hence the rod 50), bodily toward the gage block is dependent in extent upon the length of the user's hand, by means of devices hereinafter described, and that the lateral swing of the lever 49 depends in extent upon the breadth of the hand; so that the combination of the two determines the position of the gage rod relative to the steps on the gage block and therefore the kind of card ejected from the magazine.

Extending at an angle from the lever 66,

Fig. 14, is an arm 69, connected by a link 70 to one arm of a bell crank 71, which is fulcrumed on the supporting plate 52 at 72. The other arm of the lever 71 is connected by a link 73 to a stud 74 extending through the slot 54 from the under side of the carriage 58, so that at the same time the carriage 57 is being shifted to the right (as viewed in Figs. 8 and 14) the carriage 58 is being moved in a path transverse thereto. It will be observed that there is no yielding connection between lever 66 and carriage 58, hence although the lever 66 can continue to swing after carriage 57 has been checked, and thereby swing the bell crank 49 on its fulcrum, the stopping of the carriage 58 necessarily stops the lever 66 and further swinging of the bell crank lever 49. As before stated, the point at which the carriage 57 stops is determined by the length of the user's hand, and the point at which the carriage 58 comes to rest is determined by the breadth of the hand.

The mechanism for controlling the movements of the carriages according to the dimensions of the hand will now be described.

Figure 10:
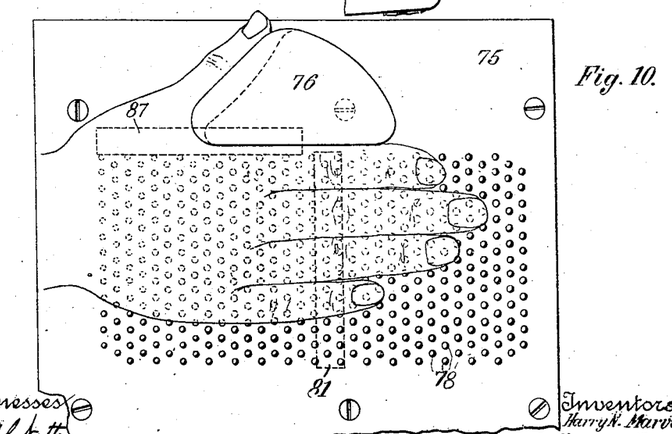
Fig. 10 is a top plan view of the gage-pin casing or box, showing a hand applied thereto in the prescribed manner.

On the top of the front extension 2 of the casing 1 is a rectangular plate 75, (Figs. 9 to 14), lying above the supporting plate 52 and arranged with its longer dimension parallel with the slot 53, which, as before stated, extends in a direction fore and aft of the machine. This plate 75 has a number of perforations, arranged in longitudinal and transverse rows, as shown in Fig. 10, and at one side of the rectangular perforated area is a stop 76, against which the hand of the user is to be placed, as shown in the figure just mentioned. Below the top plate, 75, is a bottom plate 77, having perforations registering with those in the other, the area of perforations being located above the slots 53 and 54 in the plate 52. In the perforations are loose pins, as 78, having enlargements slightly below the middle, which act as abutments and rest by gravity on the bottom plate 77, leaving the lower ends of the pins projecting equally below the said plate, as shown in Figs. 9, 11, 12 and 13. The upper ends of the pins project slightly above the top plate 75, and it is upon these upper ends that the hand of the user actually rests, in the particular embodiment now being described. Pivoted to ears 79 on the upper side of the carriage 57, at opposite sides of the slot 53, are arms 80 which carry at their forward ends a traveler 81, of a cross section like an inverted V. Pivoted on the same side of the carriage is a pawl 82, the forward end of which extends under the traveler 81 and is yieldingly supported by a spring actuated arm 83, so as to hold the traveler against the bottom plate 77, the contiguous pins being lifted thereby as shown in Figs. 11 and 12. The other end of the pawl extends rearwardly over a slot 85 in the carriage. The operation of the mechanism will now be easily understood. Assuming that a hand is resting on the plate 75, as shown in Fig. 12, and the traveler in its initial position as in Fig. 9, as the traveler moves with the carriage it will be seen that it cannot lift the pins, on account of the pressure of the hand above, hence it will be depressed and so raise the rear end of the pawl 82 out of the slot 85. When, however, the traveler passes from under the hand, and strikes a row of pins none of which is held down, that row at once permits the traveler to rise, depressing the rear end of the pawl and causing it to engage one of the teeth on a rack 86 arranged in line therewith on the supporting plate 52. Further movement of the carriage is therefore impossible, and the lineal movement of the lever 49 also, since the latter is pivoted to the carriage. It will be clear that with a shorter hand on the pins the carriage would move a less distance, and a greater distance with a longer hand. On the carriage 58 is an exactly similar traveler and pawl system, the former being designated by 87 and the latter by 88,— see Figs. 8 and 13, more particularly. The traveler 87 moves transversely under the hand and therefore measures the breadth thereof, the pawl dropping into a notch in the rack 89 as soon as the traveler escapes the hand and can elevate a row of pins. The carriage being thereby stopped the lever 66, Fig. 14, can swing no farther, and the gage rod 50 comes to rest in its final position relative to the gage block 41. It will be observed that the travelers in passing over the pins press them upward in successive rows against the palm and fingers, thus producing a sensation which creates in the mind of the operator the impression that the apparatus is actually investigating the contour and lines of his hand. Since the apparatus is primarily intended for amusement purposes any features which work to this end are important. In fact the creation of the impression just mentioned by actual engagement of the hand is one of the objects of our employment of the particular hand-gaging devices herein described.

If no hand is on the gage pins, or if the hand is improperly applied, when the machine is operated the pawls will of course drop against the first teeth on their respective racks, and in the present embodiment the proportions and arrangement of the parts are such that this will bring the gage rod short of the gage block and so permit the latter to rise to its highest position, as previously explained. It is intended that the chute thus selected will contain cards with inscriptions informing the operator that his hand was not properly placed. In the present apparatus the same result will be produced if the hand applied to the gage be very abnormally long in proportion to its width, in which case the gage rod will of course not be swung over the block at all; also if the hand be abnormally wide; in which case the rod may be swung past the block by the excessive travel of carriage 58. The remaining teeth of racks 86 and 89 are divided between the transverse and longitudinal rows of steps on the block, respectively. This plan of having several teeth for each row of steps gives the machine a certain range within which the same hand, though occupying a slightly different position on the pins each time, will in most cases select the same step and consequently cause the same kind of a card to be ejected.

As has already been explained, the gage rod cannot move in any direction after the laterally moving carriage, 58, is stopped. It is the continued movement of the lever 66 after the carriage 57 stops that causes the lever 49 to swing on its fulcrum and carry the rod over the block. Consequently the carriage 57 must have reached its final position before the other, or the rod would never be brought into operative relation with the block. Hence, the distance traveled by carriage 57 must be less than the other, or the former must move at greater speed, or both. The hand, however, is longer than it is wide, and if the machine is constructed so that the distance actually traversed by the carriages is proportional to these two dimensions they must move at different speeds. Measurements of a large number of normal hands show that the average ratio of length to breadth is as one hundred to sixty-five, or approximately one to two-thirds. In the present machine the parts are so proportioned that the carriage 57 moves at greater speed than the carriage 58, as will be seen from the fact that the lever 66 is longer than the arm 69 and bell-crank lever 71.

The link 68, (see Fig. 2), which actuates the lever 66, extends to the rear of the machine and carries a coiled spring 90, abutting at one end against a stop 91 and its rear end against a rider 92 mounted to slide on the link. The rider is engaged by the upper forked end of a lever 93, fulcrumed at 94, and normally rests against a nut 92ª, so as to give the spring a certain amount of initial tension, with the result that lever 93 can positively restore the link to its initial position after the machine is operated. The lower end of the lever is connected by a link 95 with a slide or roller 96, adapted to move in a slot 97 formed in an upstanding body 98 secured to the bottom of the casing. Extending upwardly from the slide or roller 96 is a link 99, connecting with an arm 100 rigidly mounted on the main operating shaft 44. As the shaft is rocked the lever 93 is swung on its pivot and link 68 is advanced, the spring 90 being stiff enough to prevent the rider 92 from moving on the link unless the lever 66 be positively held, as by the carriage 58, whereupon the spring will yield and permit the lever 93 to continue its motion. The slot 97, it will be observed, is in its lower portion almost vertical, so that when the roller reaches that part it will thereafter cause the link 95 merely to turn about its other end and so cease to advance the upper end of lever 93. The more inclined part of the slot is sufficiently long to give lever 93 enough movement for a complete actuation of the measuring devices, while the lower part of the slot gives a certain amount of lost motion to the arm 100, during which time the card ejecting mechanisms may be brought into operation.

Figure 1:
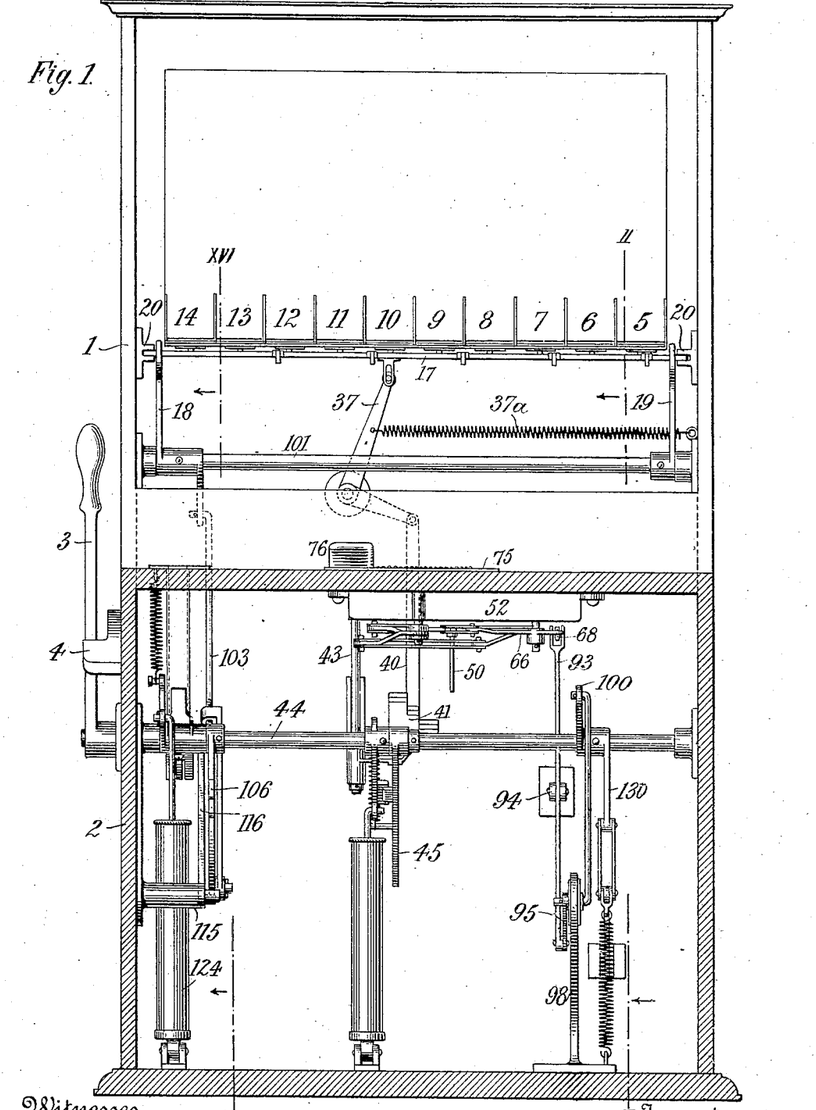
Figure 1 is a front view of the apparatus, with the front of the upper part of the casing removed; the lower part, or front extension of the casing, being in section on the line I—I, of Fig. 2.
Figure 2:
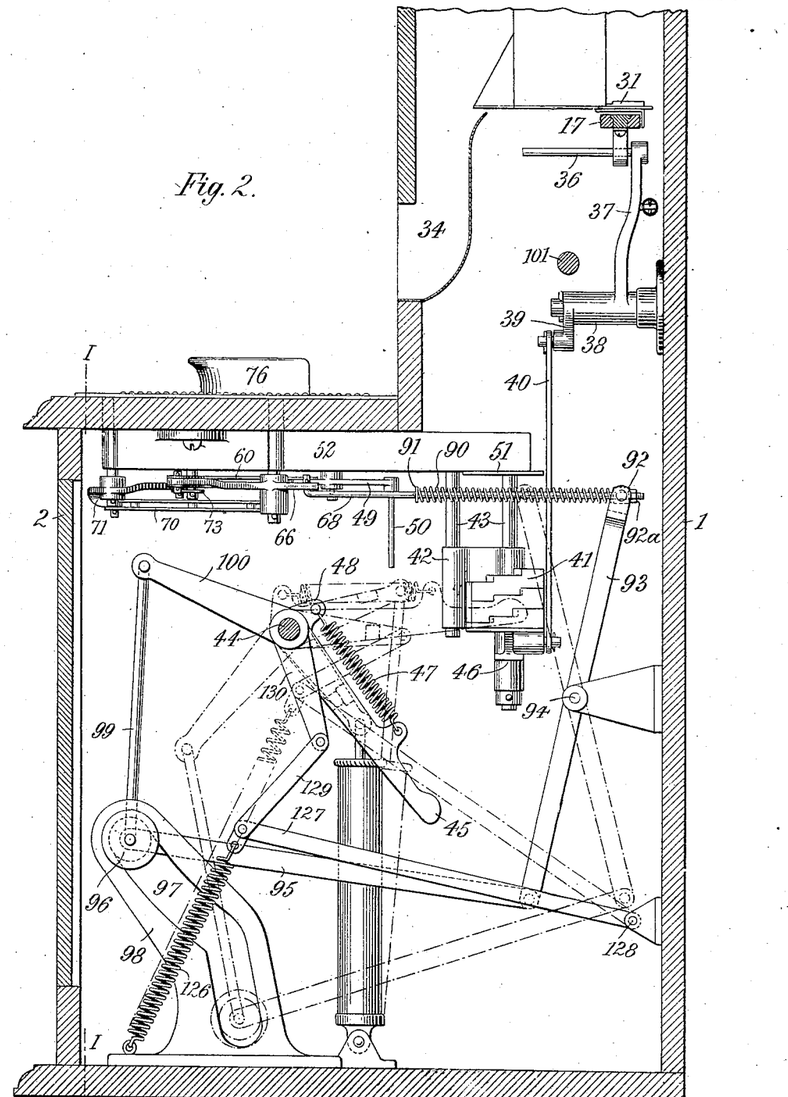
Fig. 2 is a section on line II—II, of Fig. 1, looking in the direction of the arrows.
Figures 16, 17, 18, 19:
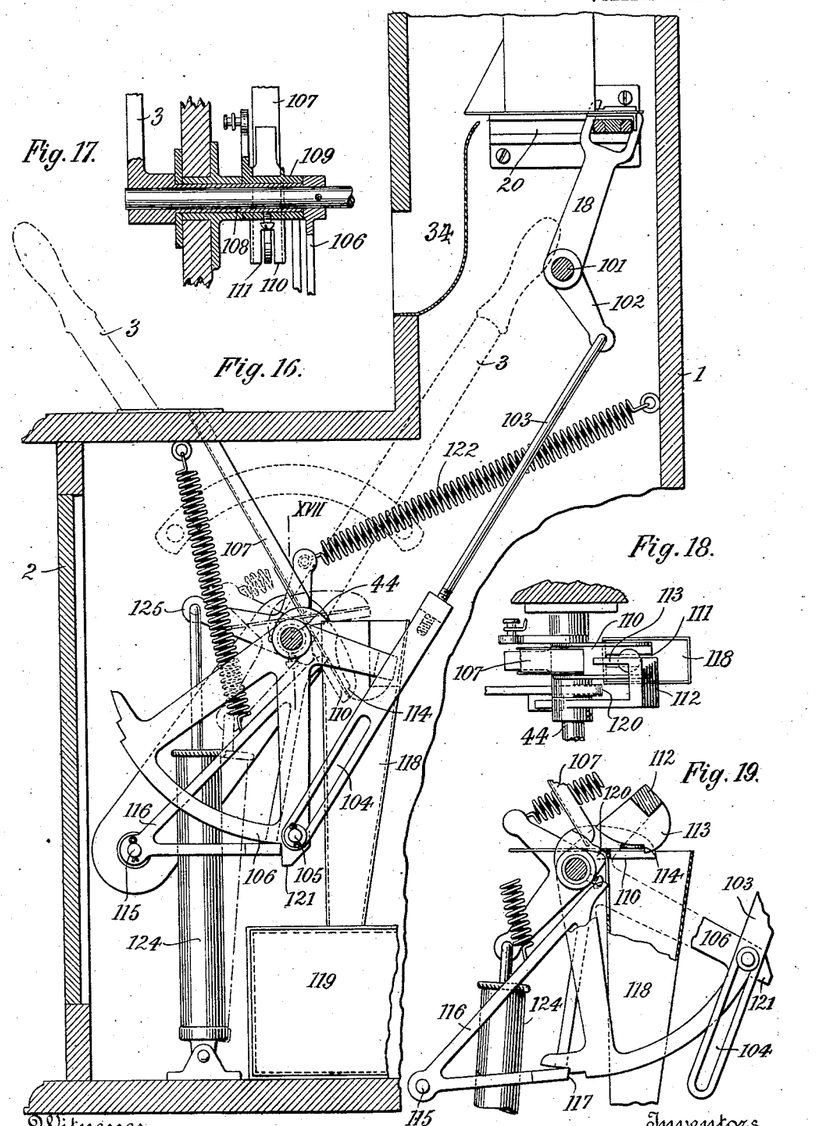
Fig. 16 is a section on line XVI—XVI, Fig. 1, looking in the direction of the arrows, showing the coin-controlled mechanism.
Fig. 17 is a detail sectional view on line XVII, Fig. 16, showing the connection of the coin-control devices with the main operating shaft of the apparatus.
Fig. 18 is a detail plan view of the coin-control mechanism.
Fig. 19 is a detail view, in side elevation, showing the positions occupied by the parts of the coin-controlled mechanism when the various functions of the rest of the apparatus have been performed.

The levers 18, 19, which actuate the ejector bar 17 are keyed to a transverse shaft 101, Figs. 1 and 16, which has an arm 102 connected to a link 103. In the lower end of the link is a longitudinal slot 104, engaging a stud 105 on a bell crank lever 106 rigidly mounted on the main operating shaft 44. The slot gives sufficient lost motion to the bell crank lever to enable the other functions of the machine to be performed before the stud 105 reaches the upper end of the slot and causes the ejector bar 17 to move forward and throw out a card.

Where the machine is to be coin-controlled any convenient coin-actuated mechanism may be employed, as for example that shown in Figs. 16 to 19. 107 is the coin chute, extending downwardly at an angle to the shaft 44 and terminating a short distance above the same. The operating handle 3 has a sleeve 108 extending over the shaft and abutting against the hub of the bell crank lever 106, as shown in Fig. 17. The sleeve is loose on the shaft, but is keyed to a sleeve 109 carrying a coin receiver 110 which in the initial position of the handle lies flat against the chute 107 and serves as a continuation thereof. The coin receiver has a slot 111 extending from its lower edge, and on the bell crank 106 is an arm carrying an extension 112 with a plate 113 lying above the said slot. If the handle 3 now be pulled forward the coin receiver will turn idly on the shaft, the slotted end of the receiver passing upward and above the plate 113, to the position shown in dotted lines in Fig. 16. If, however, a coin of the proper size is dropped in the chute 107 it will pass into the receiver 110 and rest against a lug 114 on the plate 113. When the hand lever 3 is now pulled forward the coin, acting as a bridge for the slot, as seen in Figs. 18 and 19, engages the plate 113 and carries the bell crank lever with it, thus actuating the main operating shaft 44. It is of course evident that the coin offers no impediment to the return movement of the receiver; but pivoted to a stud 115 on the side of the casing is a triangular spring-supported member 116 having a stop 117 at its rear corner, which engages a stop on the bell crank lever 104, so that the latter will remain in the position shown in Fig. 19 although the coin receiver may begin to return to its first position. In the backward movement of the receiver the coin is released from the lug 114 and slides off into a funnel 118 from which it is discharged into a suitable receptacle 119. As the handle and receiver approach their initial positions, after the coin has been freed, a cam 120 on the sleeve 109 strikes its upper corner of the stop-member 116, forcing it downward out of engagement with the bell crank lever 106 and permitting the latter to resume its first position, as in Fig. 16, with its stop 121 bearing against the stop 117 to limit the return movement of the lever. The sleeve 109 and handle 3 are rotated backward on the shaft 44 by a spring 122, connected to the back of the casing and to an arm 123 on the said sleeve. The dash-pot 124, connected with another arm, 125, on the sleeve 109, is for the usual purpose of preventing the operator from "slamming" the hand lever 3. After the bell crank lever 106 is released from the stop 117, as above described, the shaft 44 and all the parts directly connected therewith are returned to their first positions by a spring 126, Fig. 2, connected with an arm 127, pivoted to the rear of the casing at 128 and connected by a link 129 with an arm 130 rigidly mounted on the main operating shaft.

The cycle of operation performed by the machine will now be readily understood. The user places his right hand on the gage pins, as shown in Fig. 10, and having inserted a coin in the chute, grasps the hand lever and pulls it toward him. The handle being now operatively connected with the shaft 44 by the interposition of the coin, the arm 100, Fig. 2, depresses the roller 96, throwing the upper end of lever 93 forward and actuating the lever 66, Figs. 8 and 14. The carriages 57 and 58 are thereby shifted until brought to rest by the travelers passing from under the hand. The gage rod has now been set over the gage block, as previously explained, and by this time the roller 96 has reached the lower part of the slot 97 and the lever 93 ceases to move. Or, if the roller is still in the curved part of the slot the further movement of lever 93 simply compresses the spring 90 on the link 68. By this time the arm 45, Fig. 2, has reached the block 41, and raises the same until checked by the gage rod striking the plate 51. The elevation of the block lifts the link 40 and arm 39, throwing the arm 37, Fig. 3, to the left and thus setting the pawl-carrying slide in the position corresponding to the position of the gage rod relative to the steps on the gage block. The spring 47, Fig. 2, now yields and permits the main shaft to turn still farther, until the stud 105, Figs. 16 and 18, reaches the upper end of the slot in link 103 and, lifting the said link, rocks the shaft 101 and arms 18, 19, and throws the ejector bar 17 forward. Whereupon the selected ejector, engaged by the pawl, throws out a card. Upon release of the operating handle 3 the coin is discharged into the receptacle 119 and the stop member 116 is depressed by the cam 120. The main shaft being thus freed, the spring 126 rocks it backward and the parts connected to it are restored to their initial positions, in the reverse of the order in which they were brought into operation.

The embodiment herein described we consider the preferred form of our invention, but it is evident that the same may be widely varied without departing from the proper scope of the invention as defined in the following claims.

1. In an apparatus of the kind described, the combination with traveling hand-measuring devices, of a series of cards stored in different positions in a magazine, and mechanism for discharging said cards singly, said discharging mechanism being operatively connected with the said traveling hand-measuring devices, as set forth.

2. In an apparatus of the kind described, the combination with traveling hand-measuring devices, the extent of movement of which is dependent upon the dimensions of a hand applied thereto, of a series of cards stored in different positions in a magazine, and mechanism for discharging said cards singly, said discharging mechanism being operatively connected with the said traveling hand-measuring devices, as set forth.

3. In an apparatus of the kind described, the combination with a support for the hand, a traveling hand-measuring device adapted to traverse the hand support, and means for stopping the movement of the measuring device when the same reaches the limit of a hand applied to the said support, of a series of cards stored in different positions in a magazine, and means for discharging said cards singly, said discharging means being operatively connected with the measuring device, as set forth.

4. In an apparatus of the kind described, the combination of a horizontally arranged support for the hand, a horizontally movable measuring device adapted to traverse the hand support and also capable of vertical movement toward and away from the same, a plurality of gage pins movable vertically in the hand support and having their lower ends projecting into the path of the measuring device, means controlled by the vertical movement of the measuring device for limiting the horizontal movement of the same, and card selecting mechanism dependent upon the horizontal movement of the said measuring device, as set forth.

5. In an apparatus of the kind described, the combination of a plurality of vertically movable pins, a horizontally moving traveler engaging the lower ends of the pins and capable also of vertical movement, a pawl connected with the traveler, and a rack arranged to be engaged by the pawl, as set forth.

6. In an apparatus of the kind described, the combination of a horizontally arranged pin-carrier, a plurality of pins movable vertically in the carrier, a pair of travelers, one movable longitudinally and the other transversely of the carrier in engagement with the lower ends of the pins therein and capable also of vertical movement, pawls connected with the travelers, and racks arranged to be engaged by the pawls, as set forth.

7. In an apparatus of the kind described, the combination of longitudinally and transversely moving hand-measuring devices, a movable gage block controlled by the said measuring devices, a card magazine having cards stored in different positions therein, and means for selecting a card according to the extent of movement of the gage block, as set forth.

8. In an apparatus of the kind described, the combination of horizontally moving hand-measuring devices, a movable gage block having steps of different heights, card selecting mechanism connected with the gage block, and a gage rod adapted to be located in operative relation to the gage block by the handmeasuring devices, as set forth.

9. In an apparatus of the kind described, the combination of a card magazine having cards stored in different positions therein, a series of ejectors, actuating devices arranged in vernier-scale relation to the ejectors, and means for adjusting the said series of actuating devices, as set forth.

10. In an apparatus of the kind described, the combination of a card magazine having a plurality of card chutes, a series of ejectors for the several chutes, a series of actuating devices arranged in vernier-scale relation to the ejectors, adjustable longitudinally and movable transversely of the said series of ejectors, means for adjusting the series of actuating devices, and hand-gaging mechanism operatively connected with the said adjusting means, as set forth.

11. In an apparatus of the kind described, the combination of a card magazine having cards stored in different positions therein, a series of ejectors, a series of actuating devices arranged in vernier-scale relation to the ejectors, a movable gage block operatively connected with the said actuating devices to adjust the same relative to the ejectors, and hand-gaging mechanism operatively connected with the gage block to determine the extent of movement thereof, as set forth.

12. In an apparatus of the kind described, the combination of a card magazine having a plurality of card chutes, a series of card ejectors, a bar movable transversely of the series of ejectors, a slide adjustable longitudinally in the bar, ejector-actuating devices on the slide in vernier-scale relation to the ejectors, and means for adjusting the slide in the bar to select any of the ejectors, as set forth.

13. In an apparatus of the kind described, the combination of a card magazine having a plurality of card chutes, a series of card ejectors, a bar movable transversely of the series of ejectors, a slide adjustable longitudinally in the bar, ejector actuating devices on the slide in vernier-scale relation to the ejectors, means for adjusting the slide in the bar relative to the ejectors, and hand-gaging mechanism operatively connected with the said adjusting means, as set forth.

14. In an apparatus of the kind described, the combination with a support for the hand, of means for tactually engaging successive portions of the hand in succession to cause sensation therein, as set forth.

15. The combination with a hand support, of a stop for the hand, to determine the position of the hand thereon, as set forth.

16. The combination with a hand support, of a triangular stop for the hand adapted to fit between the thumb and palm of the hand to determine the position of the hand on the support, as set forth.

17. In an apparatus of the kind described, the combination of a plurality of normally depressed vertically movable pins, and means for pressing pins upwardly and in succession, against the hand applied to the upper ends of the pins, as set forth.

18. In an apparatus of the kind described, the combination of a horizontal plate constituting a support for the hand, a plurality of normally depressed pins movable vertically in said plate and arranged in rows, and means for exerting upward pressure on said rows in succession, as set forth.

HARRY N. MARVIN.
HERMAN CASLER.

Witnesses for H. N. Marvin:
  A. W. MARVIN,
  E. B. KOOPMAN.
Witnesses for Herman Casler:
  T. E. CASLER,
  M. E. RAPP.